United States Patent [19]

Alary et al.

[11] Patent Number: 4,562,021
[45] Date of Patent: Dec. 31, 1985

[54] METHOD OF MANUFACTURING A MEDIUM FOR MICROFILTRATION, FOR ULTRAFILTRATION, OR FOR REVERSE OSMOSIS

[75] Inventors: Jean-André Alary, Montpellier; Louis Cot, Clapiers; Francis Gugliermotte, Saint Jean De Cornies; André Larbot, Saint Clement; Christian Guizard, Puecharbon, all of France

[73] Assignee: Ceraver, S.A., Paris, France

[21] Appl. No.: 647,481

[22] Filed: Sep. 5, 1984

[30] Foreign Application Priority Data

Sep. 6, 1983 [FR] France ................ 83 14212
Nov. 23, 1983 [FR] France ................ 83 18648

[51] Int. Cl.$^4$ ............... B28B 1/26; B28C 1/02; B29D 27/08
[52] U.S. Cl. .................. 264/43; 210/500.2; 264/302
[58] Field of Search .............. 264/43, 301, 302; 210/500.1, 500.2, 496; 55/523, 524

[56] References Cited

U.S. PATENT DOCUMENTS 3,874,899 4/1975 Miszenti et al. ............ 55/523 X
3,944,658 3/1976 Yoldas .................... 423/626
4,251,377 2/1981 Schleinitz ................ 210/510.1

FOREIGN PATENT DOCUMENTS 1358501 7/1974 United Kingdom .

OTHER PUBLICATIONS

Yoldas, Bulent E., "A Transparent Porous Alumina", In *Ceramic Bulletin*, vol. 54, No. 3, (1975), pp. 286–288.

*Primary Examiner*—Philip Anderson
*Attorney, Agent, or Firm*—Kenyon & Kenyon

[57] ABSTRACT

The present invention relates to a method of manufacturing a medium for microfiltration, for ultrafiltration, or for reverse osmosis, wherein hydrolysis is performed on an alkoxide, an organo-metallic compound, or a metal salt of an organic or an inorganic acid, optionally dissolved in an anhydrous organic solvent, in order to obtain a sol of particles of the oxide or of the hydroxide of the corresponding chemical element, a thickening agent is added to the sol, and the resulting sol is slip cast onto a support layer having pores which are larger than pores desired for the filter medium, the thin layer deposited on the support medium is then dried, and then heat treated to eliminate the thickening agent and to sinter the particles of the deposited thin layer. The thickening agent is added to the sol in conjunction with a strong acid whose anion does not form a complex with ions of the oxide or hydroxide metal, and the slip casting is performed by mere putting into contact without filtering.

9 Claims, No Drawings

METHOD OF MANUFACTURING A MEDIUM FOR MICROFILTRATION, FOR ULTRAFILTRATION, OR FOR REVERSE OSMOSIS

The present invention relates to a method of manufacturing a medium for microfiltration, for ultrafiltration, or for reverse osmosis, wherein hydrolysis is performed on an alkoxide, an organo-metallic compound, or a metal salt of an organic or an inorganic acid, optionally dissolved in an anhydrous organic solvent, in order to obtain a sol of particles of the oxide or of the hyroxide of the corresponding chemical element, a thickening agent is added to the sol, and the resulting sol is slip cast onto a support layer having pores which are larger than pores desired for the filter medium, the thin layer deposited on the support medium is then dried, and fhen heat treated to eliminate the thickening agent and to sinter the particles of the deposited thin layer.

Proposals have already been made in the publication: B. E. Yoldas, Ceramic Bulletin, 54 No. 3 (1975) pages 286–290; to prepare alumina gels by hydrolyzing aluminum alkoxides with hot water, then peptizing the resulting suspension with a strong acid whose anion does not form a complex with aluminum. The resulting sols may be dried forming a microporous gel which can be used as a filter agent.

French patent document No. FR-A-2,150,390 proposes adding a thickening agent to the sol and performing the slip casting by the filter effect.

However, it is difficult to obtain a sol which enables a filter layer to be prepared by deposition on a macroporous support, and to obtain grains of sufficiently small size to lend themselves to applications in microfiltration, ultrafiltration and reverse osmosis.

It is also difficult to dry and bake a layer of gel deposited on a support layer without the gel cracking and crumbling.

The aim of the present invention is to provide a method of manufacturing such a medium for microfiltration, ultrafiltration, or reverse osmosis which enables easy deposition by slip casting on a support layer, and which, while the gel is being dried and baked, avoids both growth in particle size and the appearance of cracking or crumbling in the gel. Another aim of the invention is to make it possible to obtain filter media for microfiltration, ultrafiltration, or reverse osmosis having very fine pores of very similar diameters, a high degree of permeability, small and regular thickness, good mechanical strength, in particular to enable both reverse pressure backwashing and the use of high filter pressures, good chemical stability, and good resistance to attack by microbes or by enzymes.

According to a first method of manufacture, once the hydrolysis has provided a sol of the oxide or of the hydroxide of the chemical element present in the alkoxide, in the organo-metallic compound, or in the metallic salt of the organic or the inorganic acid, the thickening agent is added to the sol in conjunction with a strong acid whose anion does not form a complex with ions of the oxide or hydroxide metal, and the slip casting is performed by mere putting into contact without filtering.

This first method preferably includes at least one of the following characteristics:
The thickening agent is a polyvinyl alcohol;
The strong acid is nitric acid;
Drying is performed slowly at a temperature below the boiling point of water;
The heat treatment is performed at a temperature level and for a time sufficient to eliminate organic material derived from the thickening agent, to at least partially decompose hydroxide particles into oxide particles, and to sinter them into a strong homogenous and microporous layer adhering to the support layer; and
The greater the desired pore size for the filter layer, the greater the maximum temperature of the heat treatment.

According to a second method of manufacture, a solution is prepared of the alkoxide, of the organo-metallic compound, or of the metallic salt of the organic or the inorganic acid in an anydrous organic solvent by also dissolving therein a thickening agent, a thin layer of the mixture is slip cast on a support layer having pores of larger size than that desired for the medium, and the deposited layer is dried in a sufficiently humid atmosphere to enable the alkoxide, the organo-metallic compound or the metallic salt to be hydrolized, the deposited layer is then heat treated to eliminate the thickening agent and then to sinter the particles in the said layer.

The thickening agent is preferably an organic polymer such as an acetal resin in conjunction with a solution in an ayhydrous alcohol. In addition to nitric acid, the strong acid, which acts as a peptizing agent, may also be hydrochloric acid, perchloric acid, or trichloroacetic acid.

Both methods make it possible, in particular, to obtain media for microfiltration, ultrafiltration, or reverse osmosis, in which the particles are formed from hydroxides or oxides of aluminum, titanium, zirconium, or silicon, or mixtures thereof.

By way of example, there follow descriptions of methods of manufacturing membranes in accordance with the invention.

EXAMPLE 1

A boehmite (alumina monohydrate) is used as sold under the trade mark "Pural SB" by the Condea-Chimie company, and obtained by hydrolyzing aluminum alkoxide.

A composition A is formed by adding 18 grams (g) of "Pural SB" boehmite to 30 to 40 g of deionized water and 1.5 g of a solution comprising 10 g of nitric acid to 160 g of water.

A composition B is also prepared from:
Polyvinyl alcohol gel (12.5 g alcohol to 100 g of water) (trade mark Rhodoviol 25/140); 30–35 g.
Nitric acid solution (with 20 g of acid to 150 g water) 12–13 g.
together with an optional wetting agent to improve deflocculation and wetting of the surface on which the layer is to be deposited.

The compositions A and B are mixed and homogenized. A pasty liquid is obtained.

A porous tube having larger pores than those desired for the ultrafiltration medium is filled with the mixture. After one to several minutes the tube is emptied. A portion of the mixture remains deposited as a film on the inside surface of the film.

Drying and baking heat treatment is then performed as follows:
drying for 24 hours (h) at 20° C.;
rise from 20° C. to 200° C. in 1 hour;
rise from 200° C. to 300° C. in 1½ hours; and rise from 300° C. to 560° C. in 1 hour.

After baking at 560° C., a filter layer is obtained which is about 5 microns thick, having a pore diameter of 58 Angströms and a permeability to water at 20° C. of 5 liters/h.m.$^2$.bar.

In the end, and depending on the particular operating conditions, a thin film is obtained with a thickness of a fraction of a micron to several tens of microns, a pore diameter of a few Angströms to several thousand Angströms depending on the maximum sintering temperature, and an open porosity with the pore volume being 5% to 75% of the volume of the layer. This layer is welded to the porous support by the sintering.

The final baking temperature may be modified as a function of the desired average pore diameter. With a final temperature of 560° C. the average pore diameter is 58 Angströms. With a final temperature of 1000° C. it would be 106 Angströms, and with a final temperature of 1200° C. it would be 1100 Angströms.

In each case the distribution of pore diameters about the average value is very narrow. For example, 90% of the pore volume is made up of pores having diameters from one half to twice the average diameter.

EXAMPLE 2

50 g of aluminum isobutoxide Al(OC$_4$H$_9$)$_3$ is mixed with 360 g of deionized water. The mixture is stirred at 85° C. for 2 hours. The following reaction takes place:

$$Al(OC_4H_9)_3 + (2+x)H_2O \rightarrow AlOOH, xH_2O + 3C_4H_9OH$$

A hydroxide (boehmite) is precipitated. The precipitate is rinsed on a Buchner filter by washing with water. The precipitate is taken up while still containing a great deal of water.

A composition A is formed on the basis of this precipitate:
undried boehmite precipitate 23% by weight
deionized water 27% by weight
a solution of 20 g of nitric acid in 320 g of water 15% by weight A composition B is formed:
Rhodoviol 25/140 polyvinyl alcohol at 12.5% alcohol per 100 g water 4% by weight
deionized water 31% by weight Compositions A and B are mixed and homogenized.

A porous tube is filled with the resulting pasty liquid. After a few minutes, the tube is emptied. A portion of the liquid remains deposited as a thin film on the internal surface of the tube.

The same heat treatment is performed as in Example 1. A layer is obtained which is 2 to 3 microns thick, having an average pore diameter of 40 Angströms for a baking temperature of 750° C., or of 120 Angströms for a baking temperature of 1050° C.

EXAMPLE 3

Start from an alkoxide such as titanium ethoxide, propoxide or isopropoxide, or zirconium ethoxide, propoxide or isopropoxide, or titanium or zirconium tetrachloride.

This is dissolved in an anhydrous organic solvent such as ethanol, propanol, isopropanol or a glycol.

It is mixed with a gel constituted by a thickening polymer dissolved in the same solvent as the alkoxide (eg. an acetal resin such as those commercialized under the trade mark "Butvar" by Shawinigan or "Rhovinal" by Rhône-Poulenc).

A film of the mixture is deposited as before the porous ceramic surface on which an ultrafiltration membrane is to be formed, by filling a porous tube and then emptying the tube after a period of contact lasting for one to several minutes.

The membrane is then dried in a humid atmosphere. The departure of the solvent allows the humidity in the air to penetrate into the layer, thereby hydrolizing the alkoxide with one of the following reactions:

$$Ti(OC_2H_5)_4 + 4H_2O \rightarrow Ti(OH)_4 + 4C_2H_5OH$$

$$Zr(OC_3H_8)_4 + 4H_2O \rightarrow Zr(OH)_4 + 4C_3H_8OH$$

$$TiCl_4 + 2H_2O \rightarrow TiO_2 + 4HCl$$

The presence of the thickening agent prevents the hydroxide crystals formed during the hydrolysis from growing.

Baking then takes place up to a temperature of several hundreds of degrees centrigrade to 1000° C. so as to eliminate the organic compound by combustion and to completely decompose the hydroxide of titanium or zirconium into a dioxide. Baking is stopped when the pores have attained the desired diameter.

In comparison with ultrafiltration media based on gamma alumina, those based on oxides of titanium or zirconium have the advantage of better resisting chemical attacks.

We claim:

1. A method of manufacturing a medium for microfiltration, for ultrafiltration, or for reverse osmosis, wherein hydrolysis is performed on an alkoxide, an organo-metallic compound, or a metal salt of an organic or an inorganic acid, optionally dissolved in an anhydrous organic solvent, in order to obtain a sol of particles of the oxide or of the hydroxide of the corresponding chemical element, a thickening agent is added to the sol, and the resulting sol is slip cast onto a support layer having pores which are larger than pores desired for the filter medium, the thin layer deposited on the support medium is then dried, and then heat treated to eliminate the thickening agent and to sinter the particles of the deposited thin layer,
   characterized in that the thickening agent is added to the sol in conjunction with a strong acid whose anion does not form a complex with ions of the oxide or hydroxide metal, and in that the slip casting is performed by mere putting into contact without filtering.

2. A method according to claim 1, characterized in that the thickening agent is a polyvinyl alcohol.

3. A method according to claim 1 or 2, characterized in that the strong acid is nitric acid.

4. A method according to claim 1, characterized in that the drying is performed slowly at a temperature below the boiling point of water.

5. A method according to claim 1, characterized in that the heat treatment is performed at a temperature level and for a time sufficient to eliminate organic material derived from the thickening agent, to at least partially decompose hydroxide particles into oxide particles, and to sinter them into a strong homogeneous and microporous layer adhering to the support layer.

6. A method according to claim 5, characterized in that the maximum temperature of the heat treatment is increased for increasing desired pore size for the filter layer.

7. A method of manufacturing a medium for microfiltration, for ultrafiltration, or for reverse osmosis, wherein a solution is prepared of an alkoxide, of an organo-metallic compound, or of a metallic salt of an organic or an inorganic acid in an anhydrous organic solvent while also dissolving therein a thickening agent, a thin layer of the mixture is slip cast on a support layer having pores of larger size than that desired for the medium, and characterized in that the deposited layer is dried in a sufficiently humid atmosphere to enable the alkoxide, the organo-metallic compound or the metallic salt to be hydrolized, in that the deposited layer is then heat treated to eliminate the thickening agent and the particles in the said layer are then sintered.

8. A method according to claim 7, characterized in that the thickening agent is an acetal resin and the solvent is an anhydrous solvent.

9. A method according to claim 1, characterized in that the chemical element of the oxide or the hydroxide particles is aluminum, titanium, zirconium or silicon, or in that a mixture of compounds of these elements is used as a starting point.

* * * * *